UNITED STATES PATENT OFFICE 2,273,466

LAMINATED STRUCTURE

Ray P. Dinsmore, Akron, Ohio, assignor to Wingfoot Corporation, Wilmington, Del., a corporation of Delaware No Drawing. Application May 19, 1941,
Serial No. 394,144

2 Claims. (Cl. 154—43)

This invention relates to laminated structures composed of films of elastoplastics, for example, films of rubber hydrochloride or synthetic products such as polymerized vinyl derivatives, acrylic nitrile derivatives, etc. The invention will be described more particularly as applied to the lamination of rubber hydrochloride films.

According to this invention a film of rubber hydrochloride or other film-forming elastoplastic, which has a grain and increased tensile strength produced by stretching, calendering or extrusion, is laminated with a film of unoriented structure. This gives a laminated structure which has increased tensile strength in one direction but not the high tensile obtained by laminating only film having an oriented structure. Moreover, whereas a film which has an oriented structure has low impact tensile strength in a direction at right angles to the direction of orientation, as determined by dropping a bar onto the film with the axis of the bar parallel to the grain, the impact tensile strength of the laminated sheet of this invention is high.

The impact tensile strength may be determined by holding a strip of film one inch wide taut across suspension bars three inches apart, and dropping a cylindrical weight across the film strip. The weight may be dropped from progressively greater heights on the same film sample until failure occurs, or a fresh sample may be employed for each impact. The product of the weight (kilograms) times the height (centimeters) necessary to rupture the film is a measure of the tensile resistance to sudden force, i. e., the impact tensile strength.

The impact tensile strengths of several rubber hydrochloride films are given in the following tables to show that the film formed by laminating a single ply of rubber hydrochloride film, stretched in one direction, to a single ply of unstretched cast film, gives a laminated structure with greater tensile strength in one direction than the other. In the direction in which the single ply is stretched, it has a greater impact tensile strength than a single homogeneous ply of rubber hydrochloride of the same dimensions which has been stretched to give the same tensile strength. Such greater tensile strength and impact tensile strength is characteristic of laminated structures formed from two plies of any film-forming elastoplastic, one of which possesses an oriented structure and the other of which is unoriented.

The rubber hydrochloride films tested were:
A. Cast film 0.0025 inch thick.
B. Cast film 0.0012 inch thick.
C. Film originally 0.0075 inch thick stretched in one direction to a thickness of 0.0015 inch.
D. Film originally 0.0025 inch thick stretched in one direction to a thickness of 0.0005 inch.
E. Sheet 0.0017 inch thick formed by laminating film B and film D with heat and pressure.

The results of tests made on these films to determine their impact tensile strengths by both methods are given in the following tables:

Table 1.—Increment drop impact

| Film sample | Impact tensile strength | |
| --- | --- | --- |
| | Longitudinal | Transverse |
| A | 1.75 | 1.75 |
| B | 1.25 | 1.00 |
| C | >10.50 | 0.50 |
| D | >6.00 | 0.50 |
| E | 9.00 | 2.00 |

Table 2.—Single-blow drop impact

| Film sample | Impact tensile strength | |
| --- | --- | --- |
| | Longitudinal | Transverse |
| A | 2.00 | 2.00 |
| B | 1.00 | 1.00 |
| C | >18.00 | 0.75 |
| D | 16.00 | 0.50 |
| E | 10.50 | 1.75 |

Film having an unoriented structure may be reinforced by laminating film having an oriented structure to both its top and bottom surfaces, the grain of the latter films being parallel. Or film having an unoriented structure may be laminated to both sides of a film having an oriented structure. By various combinations of films having an oriented structure and films having an unoriented structure, laminated sheets of rubber hydrochloride and other film-forming elastoplastics having unique properties designed for a variety of different uses are obtained. Whatever the combination, the high impact tensile strength results when film having no grain is united to film which has a structure which is sufficiently oriented to give it a grain and increased tensile strength.

Usually it will be mose practical to stretch the rubber hydrochloride film longitudinally and that part of the above description which relates to film stretched in one direction relates more particularly to products made of film stretched in the longitudinal direction. Laminated products may similarly be made from film stretched in a lateral direction. Longitudinal stretching is efficiently accomplished by feeding a continuous strip of film through two pairs of rolls having different peripheral speeds and spaced a sufficient distance from one another to allow for stretching as the film passes from the one pair of rolls to the other. The first pair, which has the lower speed, is heated. On passing through this first pair of rolls the film is heated until softened to a sufficient extent to be readily stretched. It is then stretched to a desired extent in passing to the second pair of rolls which rotate at a higher speed than the first pair, and which may rotate at a speed two or as much as four or five or more times as great as the first pair of rolls. In order to stretch the film in a lateral direction it may be passed through heated rolls and then passed through a suitable tenter in which it is stretched while heated to a sufficient degree to render it easily stretchable. After stretching, the film is advantageously passed through cool rolls to set it. Other means of heating may be employed. The film may, for example, be immersed in hot water during the stretching.

Various known means of uniting the various elasto-plastic films may be employed. For example, rubber hydrochloride films may be united by the use of a solvent or by the use of a cement such as a rubber hydrochloride cement or a latex cement. The rubber hydrochloride films are preferably united by applying pressure to them while they are heated. For example, the two or more films may be united by merely passing them through heated pressure rolls. When one of the plies is stretched longitudinally by being passed through two sets of rolls having different peripheral speeds, the lamination may be effected continuously as a part of the same continuous operation at a point beyond the second set of rolls which has the higher speed. For example, the stretched film from this second set of rolls may be passed to another pair of rolls which is heated to the temperature necessary to cause coalescence of the plies and at the same time the second ply of film which is unstretched is passed through these heated rolls and united to the first-mentioned film. In this manner the stretching and lamination may be carried out as a continuous operation.

The films may be colored with pigments or dyestuffs. By laminating colored film to uncolored film or by laminating differently colored films, unusual and attractive color effects may be obtained.

The rubber hydrochloride film may be prepared as described in Calvert United States Patent No. 1,989,632 and may be stabilized with hexamethylene tetramine or other stabilizer there mentioned. It may be plasticized with butyl stearate or other suitable plasticizer if desired.

The term "elastoplastic" is used herein to refer to substances of the type classified as elastoplastics in the article entitled "Nomenclature of synthetic rubbers" by Fisher in Industrial and Engineering Chemistry (August 1939), volume 31, beginning with page 941.

This application is in part a continuation of my application Serial No. 155,917, filed July 27, 1937.

What I claim is:

1. A laminated structure, the laminae of which are plies of elastoplastic film and are united throughout their common area, one of said plies having its structure oriented in one direction (herein referred to as the first direction) so as to possess greater tensile strength in said direction than in the direction perpendicular thereto (herein referred to as the second direction), and another of said plies having a substantially unoriented structure, said laminated structure being distinguishable from a homogeneous ply of film of the same elastoplastic and of the same dimensions and having an unoriented structure, by virtue of having greater impact tensile strength in said first direction than in said second direction; and being distinguishable from a homogeneous ply of film of the same elastoplastic of the same dimensions having a structure oriented sufficiently to have the same tensile strength as the laminated structure in said first direction, by virtue of having greater impact tensile strength in said second direction than said homogeneous ply of elastoplastic film having an oriented structure.

2. A laminated structure, the laminae of which are plies of rubber hydrochloride film and are united throughout their common area, one of said plies being permanently elongated in one direction (herein referred to as the first direction) so as to possess greater tensile strength in said direction than in the direction perpendicular thereto (herein referred to as the second direction), and another of said plies being substantially unstretched cast film, said laminated structure being distinguishable from a homogeneous ply of unstretched cast rubber hydrochloride film of the same dimensions by virtue of having greater impact tensile strength in said first direction than in said second direction, and being distinguishable from a homogeneous ply of rubber hydrochloride film of the same dimensions stretched to have the same tensile strength as the laminated structure in said first direction by virtue of having greater impact tensile strength in said second direction than said homogeneous ply of stretched rubber hydrochloride film.

RAY P. DINSMORE.